United States Patent

Allen, Jr. et al.

[11] Patent Number: 5,957,256
[45] Date of Patent: Sep. 28, 1999

[54] CLUTCH BRAKE ASSEMBLY

[75] Inventors: Charles E. Allen, Jr., Rochester Hills, Mich.; Gerald J. Montgomery, Pinehurst, N.C.

[73] Assignee: Meritor Heavy Vehicle Systems, LLC, Troy, Mich.

[21] Appl. No.: 08/903,485

[22] Filed: Jul. 30, 1997

[51] Int. Cl.$^6$ .................................................. F16D 67/02
[52] U.S. Cl. ................................ 192/13 R; 192/DIG. 1; 188/73.32
[58] Field of Search ............................... 192/13 R, 18 R, 192/70.13, 98, 107 R, DIG. 1; 188/73.2, 73.32, 218 XL

[56] References Cited

U.S. PATENT DOCUMENTS

| | | | |
|---|---|---|---|
| 3,179,217 | 4/1965 | Root | 192/98 X |
| 3,942,617 | 3/1976 | Poon . | |
| 4,108,295 | 8/1978 | De Gennes | 192/13 R X |
| 4,142,619 | 3/1979 | Spokas | 192/13 R X |
| 4,512,450 | 4/1985 | Babcock | 192/18 R X |
| 5,031,739 | 7/1991 | Flotow et al. | 192/13 R |
| 5,076,406 | 12/1991 | Gregory et al. | 192/13 R |
| 5,285,881 | 2/1994 | Lero et al. | 192/13 R |
| 5,415,256 | 5/1995 | Weigland et al. | 192/13 R |
| 5,435,425 | 7/1995 | Ijames | 192/13 R |
| 5,531,306 | 7/1996 | Mason | 192/13 R |
| 5,713,443 | 2/1998 | Kronstadt . | |

FOREIGN PATENT DOCUMENTS

| | | |
|---|---|---|
| 0212925 | 3/1987 | European Pat. Off. . |
| 0275488 | 7/1988 | European Pat. Off. . |
| 32 17 759 | 11/1983 | Germany . |
| 105526 | 4/1917 | United Kingdom ................ 192/70.13 |

*Primary Examiner*—Richard M. Lorence

[57] ABSTRACT

A clutch brake assembly includes a clutch and a transmission shaft for transmitting rotational motion from the clutch to the transmission. A brake disc is rotatably driven by and slideably disposed on the transmission shaft. A clutch release member is also slideably disposed on the shaft. Brake pads are non-rotatably and removably attached to the release member and a bearing retainer on the transmission for dissipating braking energy. Each of the brake pads include a backing plate and friction material secured to the backing plate. During operation, the release member frictionally sandwiches the brake disc between the release member and the bearing retainer for reducing rotation of the shaft. The inventive brake pads are configured to facilitate replacement of the pads without disconnection of the transmission.

18 Claims, 2 Drawing Sheets

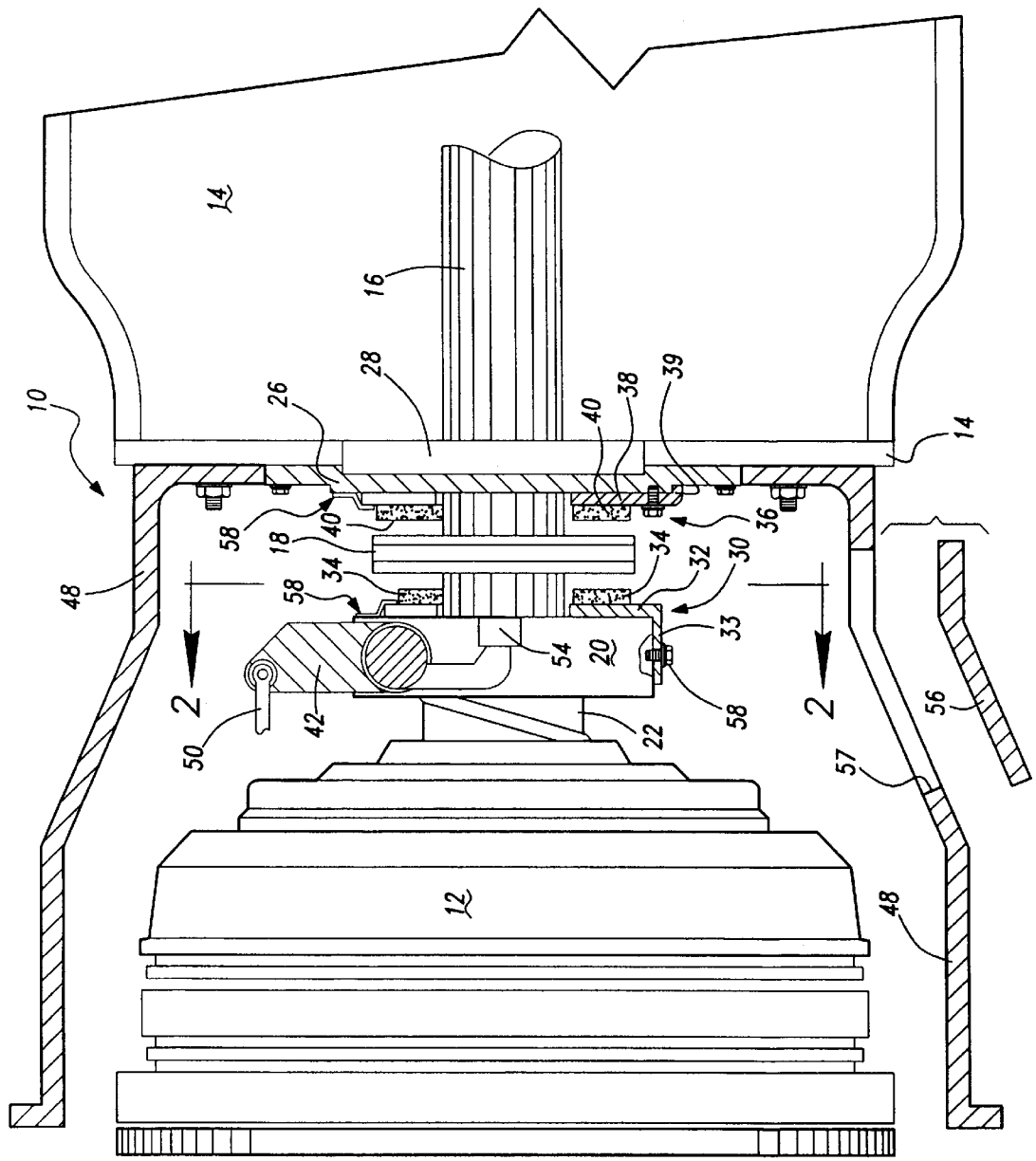

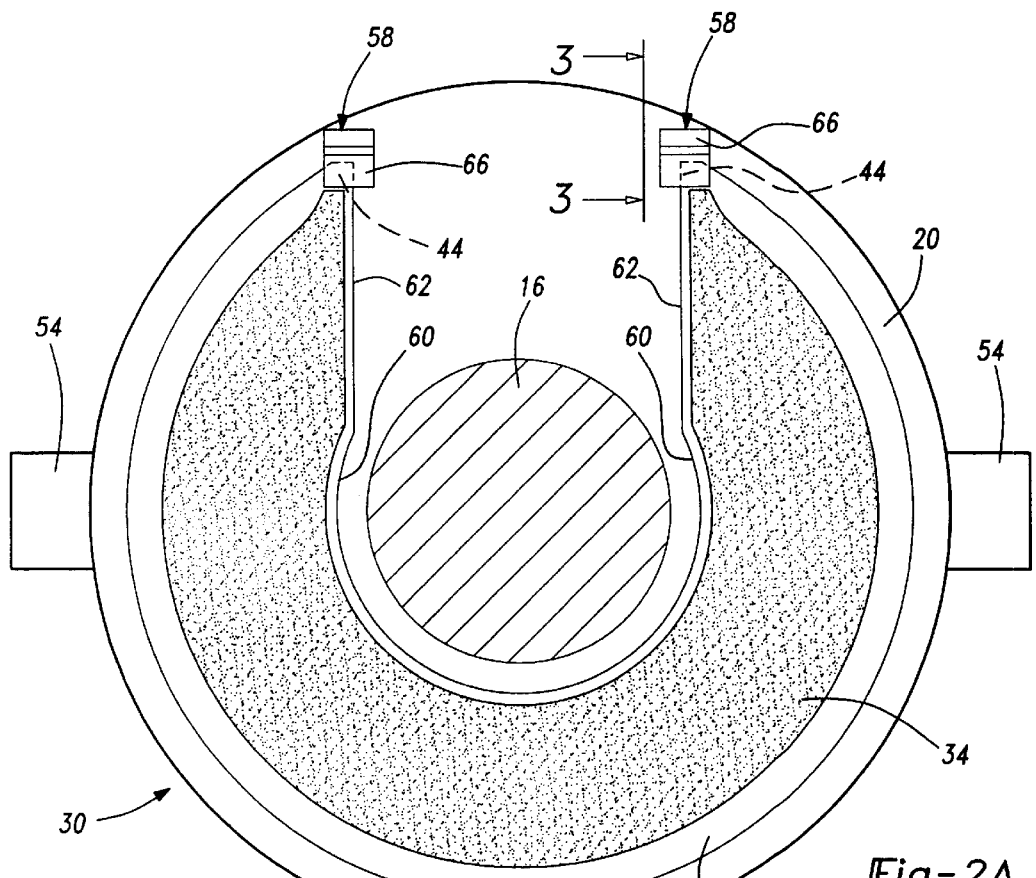
Fig-2A
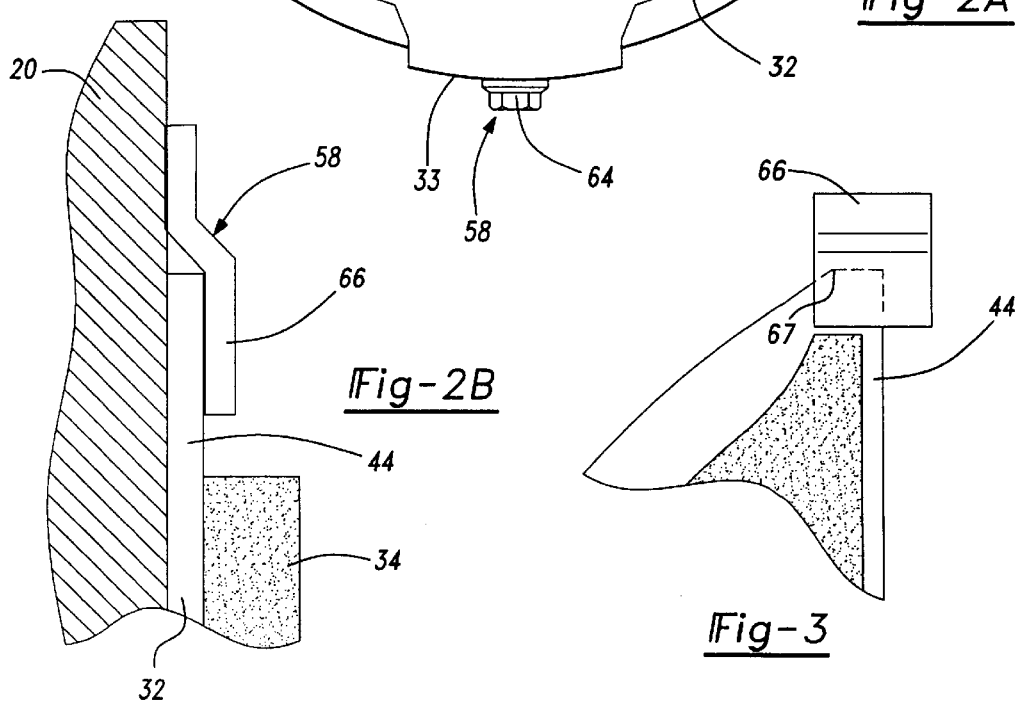
Fig-2B
Fig-3

CLUTCH BRAKE ASSEMBLY

BACKGROUND OF THE INVENTION

This invention relates to improvements in the attachment of the friction material in a clutch brake assembly.

Manual transmissions are used on many different types of vehicles and in particular trucks and other heavy vehicles. Manual transmissions typically include an input shaft and a clutch to selectively engage the transmission input shaft with an output shaft from an engine.

When shifting into first gear, low, or reverse gears, in a manual transmission the rotation of the transmission shaft should be stopped before engagement with the engine output shaft. This ensures quick engagement of the gears without gear clash.

The manual transmissions utilized on passenger cars and light duty trucks are typically synchronized transmissions. The synchronized transmissions automatically stop the rotation of the transmission shaft before engagement with the engine.

The manual transmissions utilized on heavy duty trucks and other heavy vehicles are typically non-synchronized transmissions. Non-synchronized transmissions require a mechanism for stopping the rotation of the transmission shaft. One such mechanism is a clutch brake assembly which effectively stops the rotational speed of the shaft before engagement with the engine.

Clutch brake assemblies typically include a brake disc which is rotatably driven by the transmission shaft. The brake disc can slide along the shaft between a clutch release bearing and a surface of the transmission. Friction material is bonded to both sides of the brake disc.

During shifting, the clutch brake assembly is engaged by fully depressing a clutch pedal. This operation disengages the clutch and the transmission shaft from the engine. The clutch pedal is linked to an actuation fork which moves the release bearing along the shaft toward the brake disc. The release bearing then engages the brake disc and sandwiches the brake disc between the transmission surface and the release bearing to stop any rotation of the shaft. Typically, a bearing retainer is mounted to the transmission surface for engagement with the brake disc. This type of clutch brake assembly performs well in stopping the rotation of the transmission shaft.

After repeated use, the friction material on the brake disc wears and the brake disc must be replaced. Typically the transmission must be disconnected to remove and replace the brake disc. These known discs completely surround the shaft and thus require disconnection of the shaft. As appreciated by those skilled in the art, disconnecting a transmission from a heavy duty truck or any other heavy vehicle can be very expensive, time consuming, and labor intensive. One proposed attempt to remedy this problem suggests a two piece brake disc which can be removed and replaced without removing the transmission. This suggestion has not been adapted widely in the industry.

Another deficiency is that the brake disc wears excessively on the release bearing and the bearing retainer. Accordingly, these components must sometimes be replaced, which also requires the disconnection of the transmission.

Hence, there is a need for a clutch brake assembly which does not wear on the release bearing and/or the transmission surface. In addition, there remains a need for a clutch brake assembly which can be easily replaced without disconnecting the transmission.

SUMMARY OF THE INVENTION

A clutch brake assembly includes a clutch and a transmission shaft extending to the clutch for transmitting rotational motion from the clutch to the transmission. A brake disc is rotatably driven by and slideably disposed on the shaft. A clutch release member is also slideably disposed on the shaft. In a preferred embodiment, a first brake pad is non-rotatably attached to the release member and a second brake pad is non-rotatably attached to the transmission for dissipating braking energy. Specifically, the first brake pad is removably fixed to the release member and the second brake pad is removably fixed to a bearing retainer on the transmission. Each of the first and second brake pads include a backing plate and friction material secured to the backing plate.

Most preferably, the removable brake pads are generally U-shaped such that they can be moved onto or off of the shaft without disconnection of the transmission. In a disclosed embodiment, the brake pads include underlying backing plates which are bolted to the release member and the bearing retainer. The friction material is deposited on the backing plates. Even more preferably, the backing plates are bolted to outer peripheral surfaces such that they are easily removed and attached.

During operation, the release member frictionally sandwiches the brake disc between the bearing retainer and the release member for reducing rotation of the shaft. Specifically, the brake disc is sandwiched between the friction materials on the first and second brake pads. When worn, the brake pads can be simply moved off of the shaft and the replacement pad can be moved onto the shaft without disconnection of the transmission.

Accordingly, the subject invention presents a clutch brake assembly wherein the release member and bearing retainer are not in direct contact with the brake disc. Hence, their surfaces are not worn during operation of the clutch brake assembly. In addition, the subject invention presents a pair of brake pads which are readily removable from the clutch brake assembly and can be replaced without disconnecting the transmission.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a partial cross-sectional view of a clutch brake assembly incorporating the subject invention;

FIG. 2A is a partial cross-sectional view taken along line 2—2 of FIG. 1; and

FIG. 2B is an enlarged portion of FIG. 2A.

FIG. 3 is a cross-sectional view taken along line 3—3 of FIG. 2A.

DETAILED DESCRIPTION OF THE PREFERRED EMBODIMENT

A clutch brake assembly is generally shown at 10 in FIG. 1. The clutch brake assembly 10 includes a clutch 12 and a non-synchronized transmission 14 with a shaft 16 extending from the transmission 14 to the clutch 12 for transmitting rotational motion from the clutch 12 to the transmission 14. The clutch 12 selectively engages the transmission shaft 16 with an output shaft (not shown) of an engine (not shown).

As discussed in the background section, clutch brake assemblies are typically utilized on non-synchronized transmissions and are only activated when shifting into first, low, or reverse gears. The clutch brake assembly 10 is designed to stop any rotation of the shaft 16 before engagement with the engine to provide quick engagement of the gears (not shown) without gear clash.

A brake disc 18 is rotatably driven by and slideably disposed on the transmission shaft 16. In the preferred embodiment, the brake disc 18 is a smooth metal disc. However, as appreciated by those skilled in the art, the brake disc 18 can be made of any suitable material.

A pull-type clutch release member 20 is also slideably disposed on the shaft 16 for frictionally sandwiching the brake disc 18 between the transmission 14 and the release member 20 for reducing rotation of the shaft 16. Specifically, the release member 20 is mounted to a sleeve 22 which can move within the clutch 12. The release member 20 also includes an internal bearing (not shown) for allowing the sleeve 22 to rotate within the release member 20. The structure and operation of the release member and the clutch components may be as known in the art.

A bearing retainer 26 is mounted to a surface of the transmission 14 for engagement with the brake disc 18. The bearing retainer 26 partially encapsulates an input bearing 28 on the transmission 14.

A first brake pad, generally shown at 30, is non-rotatably attached to release member 20 for dissipating braking energy. The first brake pad 30 comprises a first backing plate 32 and a first friction material 34 secured to the first backing plate 32. In the preferred embodiment, the first brake pad 30 is fixedly secured to the release member 20. A second brake pad, generally shown at 36, comprises a second backing plate 38 and a second friction material 40 secured to the second backing plate 38. In the preferred embodiment, the second brake pad 36 is fixedly secured to the retainer 26. Brake disc 18 is smooth and carries no friction surface. As appreciated by those skilled in the art, the clutch brake assembly 10 of the subject invention may only include one of the first 30 and second 36 brake pads with one surface of the brake disc 18 having a friction material adhered thereto. In addition, brake pads similar to first 30 and second 36 brake pads may alternatively be attached to surfaces of the brake disc 18.

The clutch brake assembly 10 also includes an actuation device 42 for slideably moving the release member 20 toward the brake disc 18 to frictionally sandwich the brake disc 18 between the release member 20 and the bearing retainer 26. The actuation device 42 is pivotally mounted to an exterior housing 48 surrounding the assembly 10. A link arm 50 is pivotally connected to the actuation device 42 and interconnects the actuation device 42 to a clutch pedal (not shown). Although not shown, there are two actuation devices 42, one on each side of the release member 20. The structure and operating components of the actuation device 42 may be as known in the art. It is the friction material and its attachment which provides the novel features of the subject invention.

During normal driving operation, the actuation device 42 does not touch the release member 20. In the position illustrated in FIG. 1, the actuation device 42 is just beginning to move release member 20 away from the clutch. Within the clutch 12 the sleeve 22 is pushed inward which engages the transmission shaft 16 with the engine output shaft.

During shifting operation, the clutch brake assembly 10 is engaged by fully depressing the clutch pedal which moves the link arm 50 and pivots the actuation device 42. This also disengages the clutch 12 and the transmission shaft 16 from the engine. Specifically, the actuation device 42 pushes the release member 20 away from the clutch 12 by applying force to bosses 54 which are fixed to release member 20. Subsequently, the release member 20, along with the first brake pad 30, slide along the shaft 16 toward the brake disc 18. The first brake pad 30 then engages one side of the brake disc 18 and slides the brake disc 18 toward the second brake pad 36 on the bearing retainer 26 until the brake disc 18 is sandwiched between the first 30 and second 36 brake pads. Accordingly, the brake disc 18 does not directly contact the release member 20, bearing retainer 26 or any part of transmission 14.

The exterior housing 48 surrounding the clutch brake assembly 10 has a removable portion 56 defining an opening 57 and allowing access to a retainer, generally shown at 58, of the first 30 and second 36 brake pads. The retainers 58 are discussed in greater detail hereinbelow with specific reference to FIGS. 2 and 3.

Referring to FIG. 2A, the first brake pad 30 is shown in greater detail. The first 30 and second 36 brake pads may be substantially the same, hence, only one brake pad 30 will be discussed in detail. The brake pad 30 includes an opening 60 for disposing the brake pad 30 about the shaft 16. The brake pad 30 also includes a slot 62 connected to the opening 60 for allowing removal and replacement of the brake pad 30 about the shaft 16 without disconnection of the transmission 14. In other words, the opening 60 and slot 62 of the brake pad 30 create a substantially U-shaped configuration. The opening 60 and the slot 62 are formed within the backing plate 32 of the brake pad 30. In the disclosed embodiment, the first backing plate 32 includes a first outer peripheral bent portion 33 and the second backing plate 36 includes a second outer peripheral bent portion 39. As appreciated by those skilled in the art, the opening 60, slot 62, and backing plate 32 may be of any suitable design or configuration so long as the brake pad 30 can be removed.

FIG. 2B shows each distal end 44 of the backing plate 32 preferably having a flat surface 67 that provides a torque reaction stop.

The friction material 34 of the brake pad 30 is shown generally complimentary in configuration with the configuration of the backing plate 32 of brake pad 30, although it need not be. As also appreciated by those skilled in the art, the overall configuration of the brake pad 30 along with the friction material 34 may be of any suitable design.

In the preferred embodiment, the retainer 58 for the brake pad 30 includes a bolt 64 and a pair of tabs 66. The bolt 64 secures the outer peripheral bent portion 33 of the backing plate 32 to an outer peripheral surface of the release member 20 and/or the transmission 14. Specifically, the bolt 64 secures the backing plate 32 of brake pad 30 to the release member 20 and backing plate 32 of brake pad 36 to the bearing retainer 26. Note from FIG. 1, that the bolt 64 can be on a forward face. The main goal is that the bolt 64 be easily accessible from opening 57.

Referring also to FIG. 3, tabs 66 are shown in greater detail. Tabs 66 secure each distal end 44 of the backing plate 32 to the release member 20 and/or the transmission 14. Specifically, two spaced apart tabs 66 may be welded, or otherwise attached, to both the release member 20 and the bearing retainer 26.

Now, removal and replacement of the inventive ends 44 can be explained. Cover 56 is initially removed. For removal of a pad 30 the bolt 64 is removed. The pad 30 may then be pulled out of tabs 66 and through opening 57. Replacement simply operates in a reverse manner. Because of this invention you can easily replace a brake pad through opening 57 without any disconnection of the transmission shaft 16.

While the invention has been illustrated in one type of clutch brake it does apply to other types. Specifically, torque limiting clutch brakes are included in the scope of this invention.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A clutch brake assembly comprising;
    a clutch,
    a transmission having a transmission housing,
    a shaft extending from said transmission to said clutch for transmitting rotational motion from said clutch to said transmission,
    a brake disc rotatably driven by and slidably disposed on said shaft,
    a clutch release member slidably disposed on said shaft for frictionally sandwiching said brake disc between said transmission housing and said release member for reducing rotation of said shaft, and
    at least a first brake pad including a first backing plate and a first friction material secured to said first backing plate, said first brake pad facing said brake disc and non-rotatably attached to at least one of said release member and said transmission housing for dissipating braking energy.

2. An assembly as set forth in claim 1 including a second brake pad having a second backing plate and a second friction material secured to said second backing plate, said second brake pad facing said brake disc and nonrotatably attached to at least one of said release member and said transmission housing for dissipating braking energy.

3. An assembly as set forth in claim 2 wherein said first brake pad is fixedly secured to said release member and said second brake pad is fixedly secured to said transmission housing.

4. An assembly as set forth in claim 3 including a bearing retainer mounted as part of said transmission on said transmission housing with said second brake pad fixedly secured to said bearing retainer.

5. An assembly as set forth in claim 1 wherein said brake disc is a smooth metal disc.

6. An assembly as set forth in claim 1 wherein said first brake pad includes openings for disposing said brake pad about said shaft.

7. An assembly as set forth in claim 6 wherein said first brake pad includes a slot connected to said opening for allowing removal and placement of said brake pad around said shaft.

8. An assembly as set forth in claim 7 wherein said openings and said slots create a substantially U-shaped configuration.

9. An assembly as set forth in claim 7 wherein said first friction material of said first brake pad is generally complimentary in configuration with said first backing plate.

10. An assembly as set forth in claim 1 including a retainer for removably securing said first brake pad to said one of said release member and said transmission housing.

11. An assembly as set forth in claim 10 wherein said retainer includes a bolt.

12. An assembly as set forth in claim 11 wherein said retainer includes a pair of tabs for engagement with distal ends of said first brake pad.

13. An assembly as set forth in claim 11 wherein said first backing plate includes an outer peripheral first bent portion.

14. An assembly as set forth in claim 13 wherein said bolt secures said first bent portion to said one of said release member and said transmission housing.

15. A clutch brake assembly comprising;
    a clutch,
    a transmission having a transmission housing,
    a shaft extending from said transmission to said clutch for transmitting rotational motion from said clutch to said transmission,
    a brake disc rotatably driven by and slidably disposed on said shaft,
    a clutch release member slidably disposed on said shaft for frictionally sandwiching said brake disc between said transmission housing and said release member for reducing rotation of said shaft,
    a first brake pad non-rotatably attached to at least one of said release member and said brake disc, a second brake pad non-rotatably attached to at least one of said transmission housing and said brake disc, and
    a clutch housing surrounding said clutch, said clutch housing defining an opening, said first and second brake pads being configured such that they can be removed and replaced through said opening without disconnection of said shaft.

16. An assembly as set forth in claim 15 wherein said first brake pad is fixedly secured to said release member and said second brake pad is fixedly secured to said transmission housing.

17. An assembly as recited in claim 15, wherein each of said first and second brake pads have outer peripheral bent portion to facilitate its attachment.

18. An assembly as recited in claim 15, wherein said first and second brake pads are generally U-shaped to facilitate removal and replacement.

* * * * *